United States Patent [19]

Globus

[11] Patent Number: 4,873,354

[45] Date of Patent: Oct. 10, 1989

[54] IODOPHOR

[76] Inventor: Alfred R. Globus, 26-53 210th Street, Bayside, N.Y. 11360

[21] Appl. No.: 184,250

[22] Filed: Apr. 21, 1988

[51] Int. Cl.$^4$ .......................................... C07C 143/68
[52] U.S. Cl. ..................................................... 558/51
[58] Field of Search ........................................ 558/51

[56] References Cited

FOREIGN PATENT DOCUMENTS 2044837  4/1972  Fed. Rep. of Germany ........ 558/51

Primary Examiner—Nicky Chan
Attorney, Agent, or Firm—Evelyn M. Sommer

[57] ABSTRACT

An iodophor having biocidal activity is disclosed which is a polyethylene glycol alkylarylsulfonate iodine complex. The complex is formed by reacting polyethylene glycol, alkylarylsulfonate and iodine, in the presence of water and propylene glycol as solvent under reflux conditions. This iodophor is characterized by a low iodine content, high sudsing properties, high biocidal activity, reduced vapor pressure, reduced odor and substantially non-existent staining.

6 Claims, No Drawings

IODOPHOR

This invention relates to iodophors and more particularly relates to a complex of iodine with certain types of surface agents that have detergent properties and still more particularly relates to an iodophor which is a complex of iodine with an anionic compound.

The iodophors of the invention are characterized by enhanced bactericidal, germicidal and other biocidal activity, reduced vapor pressure and odor. Staining is virtually non-existent and wide dilution with water is possible.

Complexes of compounds of a non-ionic or cationic nature with iodine to form non-ionic or cationic iodophors are already known. These compounds are generally employed as germicides and disinfectants and as presently available contain as much as 16.8% of iodine. Typical examples of the available iodophors are polyvinyl pyrrolidone: iodine, polyethoxy polypropoxyethanol: iodine and the nonyl phenyl ether of polyethylene glycol: iodine.

The term "iodophor" has conventionally been applied to any product in which surface active agents (such as nonyl phenoxy polyethoxy ethanol or Monosan-IOD) act as carriers or solubilizing agents for iodine.

Other examples of the known iodophors are the products sold under the following trademarks: Biopal CVL-10, Wescodyne, Idonxy, Westamine X, Showersan, Kleenodyne, Iosan and Iobac.

The aforesaid known iodophors are, as already indicated, complexes of a compound of non-ionic or cationic nature with iodine.

The inventor herein is not aware of an iodophor heretofore described or available which is truly based on an anionic compound. This is probably because anionic compounds do not normally form iodine complexes. Unless the iodine is actually complexed, the marked staining properties, toxicity, instability, corrosiveness, etc., characteristic of elemental iodine are quickly made apparent.

In accordance with the invention, there is now provided an improved class of iodophors. These iodophors are superior to the non-ionic and cationic iodophors heretofore available and are themselves, as well as the compositions prepared therefrom, far more effective than any of the iodophors prepared on the basis of a non-ionic or cationic compound.

The iodophors of the invention are, moreover characterized by a low iodine content, suds profusely, clean extremely well, do not stain the skin even if the iodophor is allowed to remain on the skin in full strength for one hour (they can be wiped or rinsed off without leaving any perceptible residue), are completely soluble in water in all proportions, and evaporate only very slowly, behaving as a high boiling oil in this respect. Despite the fact that they do not stain the skin when applied thereto, they have a characteristic orange-amber color, which until they are removed, indicate the area of the skin to which they have been applied.

As noted above, the iodophors of the invention have very low iodine contents and specifically only about 0.5% iodine. However, even when diluted at least ten times, these iodophors are capable of killing 100% of either gram-negative or gram-positive organisms within ten minutes.

This surprising activity of the instant iodophors characterized as they are by low iodine contents, is attributable to the fact that the iodophors of the invention have the iodine bound in the monoatomic form, unlike the non-ionic or cationic iodophors which have much higher iodine contents but less activity per percent of iodine, as the iodine in the case of the non-ionic and cationic iodophors is bound in the diatomic form ($I_2$).

There is now provided an iodophor constituting a polyethylene glycol-anionic surface active agent—iodine complex, preferably a polyethylene glycol—alkylarylsulfonate-iodine complex.

The polyethylene glycol component preferably has a molecular weight equivalent to 300–500 ethylene oxide molecules.

The alkylarylsulfonic acid moiety is preferably dodecyl or tetradecylbenzenesulfonic acid but the corresponding toluenesulfonic acids are equally suitable.

The surface active agents which have been used to advantage include synthetic anionic detergents. The higher alkylmononucleararomaticsulfonates are preferred, particularly the LAS type such as the higher alkylbenzenesulfonates containing from 10 to 16 carbon atoms in the alkyl group, for example, the sodium salts such as decyl, undecyl, dodecyl (lauryl), tridecyl, tetradecyl, pentadecyl, or hexadecyl benzenesulfonate and the higher alkyl toluene, xylene and phenolsulfonates; alkylnaphthalenesulfonate, ammonium diamylnaphthalenesulfonate, and sodium dinonylnaphthalenesulfonate.

The solvent in which the complexing reaction is carried out is preferably propylene glycol but other non-toxic glycols may be used with equally good results.

The elemental iodine is both the active ingredient and also serves as the catalyst for the complex formation.

The iodophor is formed by the reaction of the polyethylene glycol with the alkylarylsulfonic acid and the iodine in the propylene glycol.

It was to have been expected that this reaction would have had to be carried out under anhydrous conditions, since water, if present, would reverse the formation of the ester. Quite surprisingly this is not the case here and this is the only reaction known to the inventor in which an ester-type compound is formed in the presence of water, and where the water is actually required in order to carry the reaction forward. It is the water which actually causes the iodine to form the polyethylene glycol - alkylarylsulfonate-iodine complex.

As formed in the reaction, the complex is an orange-amber liquid.

In accordance with the invention it has been found that many variations in the selection of reactants are permissible, particularly in the size of the polyethylene glycol molecule, the precise nature of the alkylarylsulfonic acid, the amount of propylene glycol or even the type of glycol utilized. Some variation in the amount of water would also appear to be acceptable.

A typical formulation and one which is preferred follows:

| | |
|---|---|
| polyethylene glycol (mol. wt. about 17,000) | 65.0% by weight |
| sodium dodecylbenzenesulfonate, 99% | 5.0% by weight |
| iodine crystals, U.S.P. | 1.1% by weight |
| propylene glycol, U.S.P. | 24.45% by weight |
| deionized water | 5.0% by weight |

The mixture formed from the components as set out above is stirred slowly and refluxed with care. Iodine in elemental form will come over in the reflux condenser. However, any condensed water washes this iodine back into the reactor. Rapid stirring or rapid refluxing is to be avoided as this will result in the loss of iodine and possible incomplete reaction or even decomposition of the desired complex.

The stability of the complex which is formed is remarkable. In an accelerated test, at the end of two years, equivalent to more than five years at room temperature, the product showed no appreciable decrease in active iodine content.

Even more interesting is the strange activity of this compound when diluted and allowed to stand. While the diluted solution is a golden yellow color, upon standing diluted for several days, the color disappears, the resultant product becoming colorless. In view of the stability of the concentrate, this instability of the diluted solution appears to be due to the monoatomic nature of the iodine in the complex. Since it is applied full strength and then diluted when used as a scrub, as a cleanser, antiseptic, etc., this dilution allows the full activity of the iodine to be expended in its monoatomic form. The rearrangement of the iodine in the resultant diluted form results in its gradually losing its color.

The reaction between the components i.e., polyethylene glycol, alkylarylsulfonate and iodine in the formulation set out above, would have not been believed possible, since it depends upon the reaction between the polyethylene glycol and the sodium dodecylsulfonate. Actually, however, in accordance with the invention the iodine functions both as a reagent and a catalyst, apparently, in the presence of the water. The reaction of the iodine and the water under the conditions employed results in the formation of acid (hydriodic acid) which combines with the sodium of the alkylarylsulfonate. The acid form of the latter then reacts with the polyethylene glycol to produce an ester which hold the balance of the iodine as elemental iodine. For this reason, a little more than one-half the iodine is consumed in the ester formation, the iodine content falling from 1.1% to from 0.45 to 0.52. The product has been made, however, with as much as 0.57%. The lost iodine does not titrate as iodine (presumably because it is present at the end of the reaction as an iodide) and only the elemental iodine can be determined by titration with standard sodium thiosulfate solutions. The additional iodine, present in inert form, can be determined by treating the product with chlorine (elemental) to release the iodine from the iodide. Since this iodine has no activity, the only purpose for doing this is to trace the reaction products.

While the example given above is the preferred embodiment of the invention, the iodophors can be prepared using the reaction components in the following ranges:

| | | |
|---|---|---|
| (1) | polyethylene glycol (mol. wt. 13,000–24,000) to | % by weight |
| (2) | alkylarylsulfonate (C10-16 alkyl) benzene or toluene to | % by weight |
| (3) | iodine crystals to | % by weight |
| (4) | propylene glycol to | % by weight |
| (5) | deionized water to | % by weight |

What is claimed is:

1. An iodophor comprising the reaction product formed by reacting polyethylene glycol, an alkylarylsulfonate and iodine in the presence of water and propylene glycol as solvent wherein aryl designates benzene, naphthalene, toluene or xylene.

2. An iodophor according to claim 1, wherein said polyethylene glycol has a molecular weight equivalent to 300 to 500 ethylene oxide molecules.

3. An iodophor according to claim 1, wherein said alkylarylsulfonate is an alkylbenzenesulfonate.

4. An iodophor according to claim 3, wherein said alkylbenzenesulfonate is the sodium salt of decyl, undecyl, dodecyl, tridecyl, pentadecyl or hexadecyl benzenesulfonate.

5. An iodophor according to claim 3, wherein said alkylbenzenesulfonate is sodium dodecylbenzenesulfonate.

6. An iodophor according to claim 1, wherein said alkylarylsulfonate is a higher alkyl toluene, xylene, or naphthalene sulfonate.

* * * * *